Figure 1:
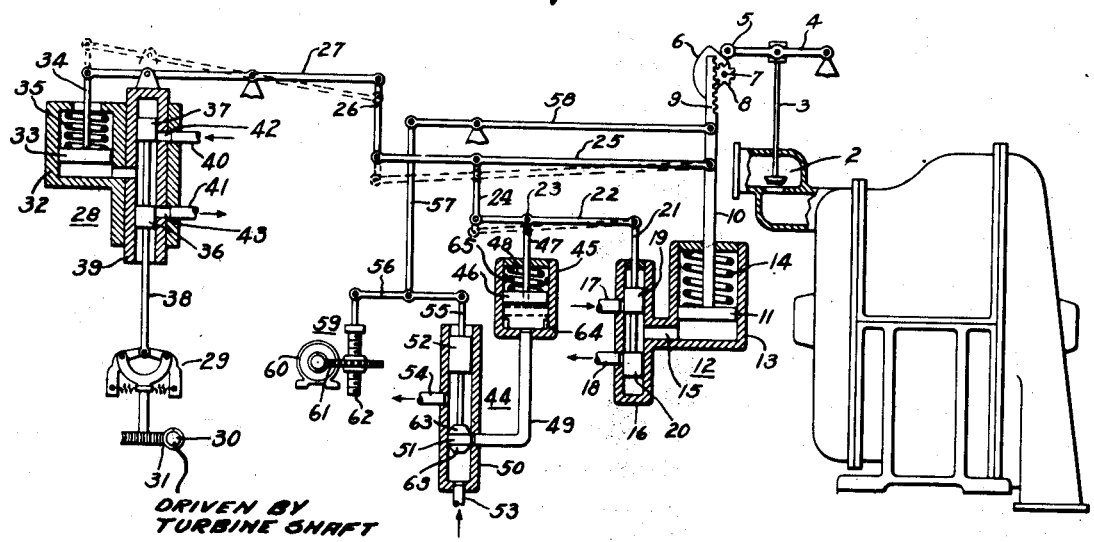

July 10, 1934.  R. G. STANDERWICK  1,966,225

REGULATING MECHANISM FOR PRIME MOVERS

Filed Dec. 26, 1931

Inventor:
Reginald G. Standerwick
by Charles E. Mullan
His Attorney.

Patented July 10, 1934

1,966,225

UNITED STATES PATENT OFFICE 1,966,225

REGULATING MECHANISM FOR PRIME MOVERS

Reginald G. Standerwick, Marblehead, Mass., assignor to General Electric Company, a corporation of New York Application December 26, 1931, Serial No. 583,173

5 Claims. (Cl. 264—7)

The present invention relates to regulating mechanisms for prime movers, more particularly to the regulating mechanism for elastic fluid engines driving electric generators connected in parallel with other sets to a power line, although it is not necessarily limited thereto.

In power plants it is the practice to provide one or more sets for supplying a substantially constant or base load to a power system and one or more additional sets for supplying a variable load to this system in accordance with the change in demand for load. It is preferable in such systems to provide the base load sets with a speed governor control as there are times when system disturbances occur, such as sudden short circuits in case of an electric power system in the proximity of the station. It is then of advantage to close the admission valve means of the base load sets. It will be readily seen that in case both the base load set and the additional sets are provided with a speed governor control, a change in demand for load will be divided among both of these sets. The transfer of changes in load to the base load sets however is undesirable as experience has shown that these sets, particularly when they are provided with a broad regulation, have a tendency to pull out of step when load changes occur. Furthermore, changes in load have an undesirable effect on the efficiency of these base load sets. In order to secure safe operation of a power plant system it is therefore desirable to normally maintain the load of base load sets constant and to transfer the total load changes to the additional sets.

The object of the present invention is to provide an improved regulating mechanism for prime movers, particularly those carrying base load, whereby slight, slow variations in speed or frequency of the system have no effect on the load output of these sets. By slight variations in frequency I mean variations of the order of 0.2 to 0.5 of a cycle at a normal frequency of 60 cycles.

For a consideration of what I believe to be novel and my invention, attention is directed to the following description and the claims appended thereto in connection with the drawing which forms a part of my specification.

Figure 2:
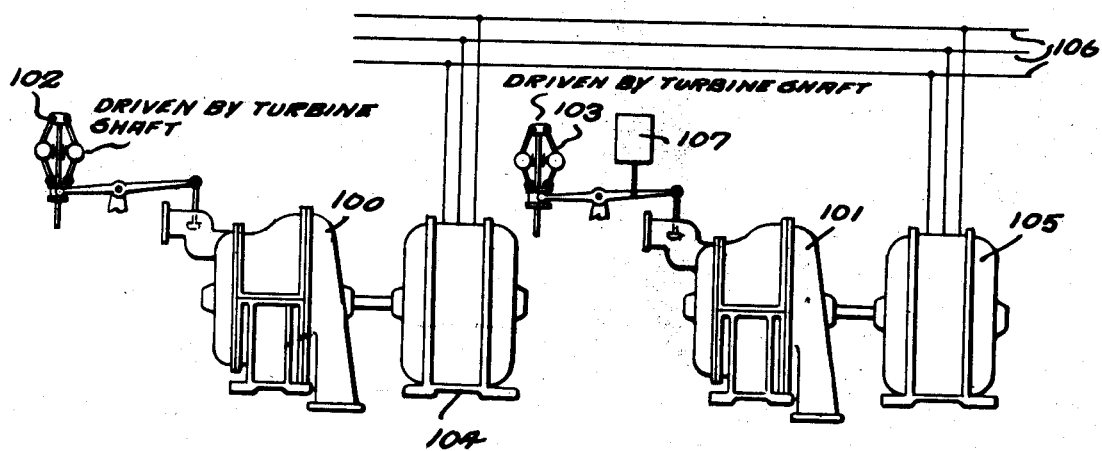

In the drawing I have shown by way of example in Fig. 1 a regulating mechanism for an elastic fluid turbine, partly in cross section and partly diagrammatic, embodying my invention. Fig. 2 illustrates diagrammatically a power plant in accordance with my invention.

Referring to Fig. 2, where I have shown the general arrangement of a power plant in accordance with my invention, 100 and 101 designate elastic fluid turbines each of which is provided with a speed regulating mechanism, 102 and 103 respectively, for controlling the supply of actuating fluid. 104 and 105 are electric generators driven by the turbines and connected to a common line 106. With such a system a change in load demand is transferred to both generating sets in accordance with their capacities and the setting of their governors. According to my invention I provide a mechanism 107 for set 101, 105 operating as a base load set for preventing the transfer of load changes to this set as long as normal operating conditions exist in the power system. The mechanism 107 effects compensation of valve movement caused by the speed governing mechanism 103 at slow changes of load. Other details and characteristics of this mechanism will be more fully understood from a consideration of Fig. 1, in which, 1 indicates a prime mover corresponding to prime mover 101 of Fig. 2, in the present instance shown as an elastic fluid turbine, having a valve means 2 for controlling the supply of elastic fluid or actuating substance to the turbine. 3 is the stem for the valve which is pivoted to a fulcrumed lever 4 carrying on its left hand end a roller 5. The latter engages a cam 6 provided on a shaft 7 which in turn carries a pinion 8 meshing with a rack 9. Rack 9 has an extension 10 to which a piston 11 of a fluid actuated motor 12 is fastened. The latter includes a cylinder 13 in which the piston 11 is movably arranged and biased in downward direction by a spring 14 provided between the piston and the upper part of the cylinder. Connected to the lower part of the cylinder through a passage 15 is a control means or pilot valve for the motor including a casing 16 having inlet and outlet ports 17 and 18 respectively which normally are covered by valve heads 19 and 20 respectively. The latter are carried by a stem 21 pivoted to the right hand end of a lever 22.

In operation, a downward movement of the valve heads permits oil or like liquid to be drained off from the lower part of cylinder 13 through passage 15 and outlet 18, whence it may be returned to any suitable point not shown. This causes a downward movement of piston 10 by action of spring 14 whereby pinion 8 and cam 6 are turned in a direction to cause closing of valve means 2. The downward movement of piston 10 causes, through a lever mechanism, described later, the pilot valve to assume its original position. An upward movement of the pilot valve heads causes oil or like liquid to be supplied through port 17 and passage 15, to the lower part of cylinder 13 whereby the piston is forced upwardly to cause turning of cam 6 in a clockwise direction resulting in the opening of valve 2.

Lever 22, which for the ordinary operation may be considered as having a fixed fulcrum indicated at 23, is connected through a link 24 to a floating lever 25 having one end connected to stem 10 and another end connected through a link 26 to a fulcrumed lever 27. The left hand end of lever 27 is controlled by a speed governor, in the present instance through the intermediary of a motor indicated as a fluid actuated motor 28 which in turn is controlled by a speed governor 29 driven from the turbine shaft 30 through a worm gear 31. Fluid actuated motor 28 comprises a cylinder 32 in which a piston 33 is freely movable and provided with a stem 34 pivoted to the left hand end of lever 27. A biasing means, shown as a spring 35 forces the piston in a downward direction. The motor is controlled by a pilot valve having valve heads 36 and 37 provided on a stem 38 which in turn is pivoted to the weights of the speed governor. Surrounding valve heads 36 and 37 is a sleeve or bushing 39 pivoted to an intermediate point of lever 27. 40 and 41 are ports registering with openings 42 and 43 respectively in the bushing through which oil or like liquid may be supplied or drained off. The openings of the bushing are normally covered by the pilot valve heads.

The mechanism so far described may be considered as typical of a mechanism for regulating the load output of a prime mover in terms of speed changes. Its operation is as follows: Assume that the turbine drives a generator connected to a power line. If the demand for load from the power line increases it will cause a decrease in frequency and accordingly a decrease in speed of the prime mover. This effects an inward movement of the weights of the speed governor to the effect that stem 38 is moved upward. Pilot valve head 37 thereby uncovers its port and permits oil to be supplied to the lower part of cylinder 32 whereby piston 33 is forced upward against the pressure of spring 35. This causes a turning motion of fulcrumed lever 27 in clockwise direction. Bushing 39 is thereby moved upward to the effect that the control means or pilot valve assumes its normal position. The turning movement of lever 27 also causes, through link 26, lever 25 and link 24, a turning movement of lever 22 about pivot 23 as fulcrum. Pilot valve head 19 thereby moves upward to uncover its port 17 and to permit oil to be supplied to cylinder 13. This causes, in the manner described above, an opening of admission valve 2 of the turbine and accordingly an increase in load output of the latter and an increase in speed in accordance with the new load output.

When the speed of the turbine increases owing to a decrease in demand for load, the weights of the speed governor will move outwardly and the mechanism will perform similar motions as described above but in the opposite direction to the effect that admission valve 2 is closed and the load output and accordingly the speed of the turbine or prime mover decreased.

As stated above, a change in load output caused by slight variations in speed is undesirable with respect to prime movers carrying base load. According to my invention the output of such prime movers is maintained substantially constant at slight variations of speed by the provision of means counteracting or compensating the regulation caused by the speed governor. These counteracting or compensating means have been shown in the present instance as a fluid actuated motor 44 comprising a cylinder 45 in which is movably arranged a piston 46 fastened to a stem 47, the upper end of which is pivoted to lever 22 as indicated at 23 forming thereby a variable fulcrum. 48 is a spring for forcing the piston downward. Connected to the lower part of cylinder 45 by means of a conduit 49 is a control means shown as a hydraulic relay or pilot valve 50 having valve heads 51 and 52 of which the first normally covers the opening to conduit 49. 53 is a conduit from which oil or like liquid may be supplied to the lower part of the motor cylinder and 54 is a conduit for draining fluid therefrom. The pilot valve heads are fastened to a stem 55 which in turn is pivoted to the right hand end of a floating lever 56. The latter is connected through a link 57 and a fulcrumed lever 58 to stem 10. 59 indicates a synchronizing arrangement comprising a motor 60 driving a worm gear 61, the gear of which having a screw-threaded bore engaging a screw-threaded rod 62 which in turn is pivoted at its upper end to the left hand end of lever 56. It will be understood that rotation of the motor causes turning of the gear in either direction whereby rod 62 is moved upward or downward.

The operation of the mechanism is as follows:

A decrease in speed causes through the ordinary speed governing mechanism an upward movement of rack 9 and stem 10 as described above. This movement effects through fulcrumed lever 58 and link 57 a downward movement of the right hand end of lever 56 whereby the pilot valve head 51 uncovers its port and permits oil to be drained off from the lower part of cylinder 45. This causes a downward movement of piston 46 by action of biasing means 48 to the effect that that right hand end of lever 22 moves downward and thereby causes pilot valve head 20 to uncover its port to permit oil to be drained off from cylinder 13. This causes a downward movement of piston 11 and accordingly a similar movement of stem 10 to the effect that the upward movement of the piston caused by the ordinary speed governor mechanism is compensated or from another viewpoint, the valve gear is repositioned to assume its normal position and maintain the load output of the turbine constant. The downward movement of piston stem 10 also causes a turning movement of fulcrumed lever 58 in clockwise direction to the effect that link 57 is moved upwardly and causes a corresponding upward movement of the pilot valve stem 55 whereby the pilot valve head 51 assumes its original position. At the end of the operation the lever 58 assumes its original position. In other words, the position of this lever fixes the load. The other levers of the mechanism change their position in accordance with changes in speed. In the drawing I have indicated in dotted lines a new position for levers 27, 25 and 22 corresponding to changed speed.

When the speed increases, the ordinary governing mechanism will effect a closing movement of valve 2 as described above. Piston stem 10 thereby moves downwardly and cause through lever 58, link 57 and lever 56 a corresponding upward movement of pilot valve head 51, thereby permitting oil or like liquid to be supplied to motor cylinder 46 to cause an upward movement of variable fulcrum 23 and of the right hand end of lever 22 which in turn causes an actuation of motor 12, resulting in an upward movement of piston stem 10 whereby the first movement thereof caused by the speed governor mechanism is compensated. It will be readily understood that the compensation of the valve actuation by the speed governing mechanism is effected by a means counteracting or opposing the speed governing actuation. The operation of the latter is initiated by the action of a part of the ordinary speed governing mechanism, in the present instance by the movement of piston 10 of motor 12. The counteraction or compensation, effects a displacement or varying of fulcrum 23 of lever 22 in terms of movement of motor 12.

It is generally desirable to distribute sudden load changes of the power plant in the first instant among all the prime movers, that is, also among all those carrying base load in order to prevent unbalancing of the prime movers adapted to finally take over said load changes. To this end I provide for the complete actuation of valve gear 2 by the ordinary speed governor when the speed changes suddenly, even though the magnitude of the change may be small. This is accomplished by the regular governing means, assuming that during this momentary interval the fulcrum point 23 remains substantially fixed. The turbine thereby is adapted to take over sudden changes in load to momentarily stabilize the frequency of the system. The action of the counteracting or compensating means or corrector is to bring the valve means back again relatively slowly to its original position in order to finally maintain constant the load output of the base load set within certain variations in speed. If, however, these variations exceed a predetermined value it is desirable that the valve position be changed in response to changes in speed. For this purpose I provide means for limiting the compensating action, in the present instance indicated as stops 64 and 65 for piston 46 of the counteracting or compensating means. The bottom of cylinder 45 and the spring 48 in its compressed stage may also serve for limiting the compensating action.

When the speed of the turbine decreases beyond a certain predetermined value the counteracting means is prevented from further compensating actuation because piston 46 then engages stops 64. Further decrease in speed thereby causes through the ordinary speed governing mechanism opening of admission valve 2. Also, when the speed of the turbine increases beyond a certain predetermined value the counteracting means is prevented from further compensating actuation because piston 46 then engages stops 65. Further increase in speed thereby causes closing of valve 2 and accordingly a decrease in turbine load. Thus, as soon as the frequency change exceeds a predetermined value of about plus or minus one half of a cycle, the turbine operates under straight speed control. With the provision of the limiting means, motor 44 and lever mechanism 57, 58 form in substance a means for compensating the actuation of the speed governor control means within a predetermined range of load. For example, the limiting means may be provided so that the turbine load is maintained substantially constant within a range of 75 per cent to 100 per cent of the normal load of a power station. If the station load increases or decreases beyond this range, a part of the load change will be transferred to the base load set.

The actuation of the counteracting or compensating means is relatively slow compared with the actuation of motor 12. The rate of bringing back or repositioning the valve gear to normal position at small or slow variations in speed will be slow as compared to the actuation at large or sudden variations in speed. In order to decrease the returning movement of the valve and thereby to avoid overshooting of the valve, I provide according to my invention a special hydraulic relay for motor 44. In the present instance I have shown a relay in which the pilot valve head 51 is provided with a tapered extension 63 on each side. These extensions secure slow action of the counteracting or compensating means as long as the valve of the turbine is near its normal position whereby overshooting of the valve, as already mentioned, is prevented. The slow action is due to the resistance of flow of actuating fluid to and from cylinder 45 caused by the projecting tapered portions 63 of valve head 51.

The synchronizing means 59 permits setting of the load of the turbine in the following manner: Turning of motor 60 in one direction may cause rod 62 to move upward whereby the right-hand end of lever 56 forces the pilot valve heads downward, effecting oil to be drained off from the lower part of cylinder 45 so that fulcrum 23 moves downward. This causes a similar movement of pilot valve head 20, permitting oil to be drained off from cylinder 13, resulting in a downward movement of piston 11 and closing of admission valve 2. Rotation of motor 60 in the opposite direction causes a similar operation of the different parts but in the opposite direction, to the effect that valve means 2 is opened.

With my invention I have accomplished a reliable governing mechanism for prime movers whereby the load output is maintained substantially constant at slight, slow changes in speed. This permits a more safe operation of power systems, as it stabilizes the prime movers carrying base load. At slow changes in speed the compensating action takes place practically simultaneously with the valve movement of the prime mover so that the valve moves only slightly out of its normal position. If, however, a sudden speed change occurs, my mechanism permits the valve being moved accordingly so that the prime mover takes over in the first instant a part of the load change, preventing too great a load change from being suddenly transmitted on other prime movers working in parallel with the base load carrying prime mover. Sudden load changes momentarily taken over by the base load set are gradually transmitted from said set to the other prime movers, to the effect that unbalancing of the latter, as well as of the whole system, is substantially prevented.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In combination with a prime mover having valve means for controlling the supply of an actuating substance, a motor for moving the valve means, a control means for the motor, a speed governor driven by the prime mover actuating the control means, another motor actuated through the first named motor for moving the control means in opposition to the speed governor regulation to maintain the load of the prime mover substantially constant.

2. In combination with a prime mover having valve means for controlling the supply of an actuating substance, a motor for moving the valve means, a control means for the motor, a speed governor driven by the prime mover actuating the control means, another motor actuated through the first named motor for regulating the control means in opposition to the speed governor regulation to maintain the load of the prime mover substantially constant, and stops for limiting the movement of the other motor.

3. In combination with a prime mover having valve means for controlling the supply of an actuating substance, a motor for moving the valve means, a control means for the motor, a lever mechanism connected to the control means and having a variable fulcrum and a speed governor driven by the prime mover and connected to the lever mechanism for actuating the control means, and means for varying the fulcrum in terms of movement of the motor to cause movement of the motor in a sense opposite to that of the speed governor to maintain the load output of the prime mover substantially constant.

4. In combination with a prime mover having valve means for controlling the supply of an actuating substance, a motor for moving the valve means, a control means for the motor, a lever mechanism connected to the control means and having a variable fulcrum, and a speed governor driven by the prime mover and connected to the lever mechanism for actuating the control means, means for varying the fulcrum in terms of movement of the first named motor to cause movement of said motor in a sense opposite to that caused by the speed governor for maintaining the load output of the prime mover substantially constant, said means for varying the fulcrum including another motor connected to the fulcrum and a control means for the other motor actuated by the first named motor.

5. In combination with a prime mover having valve means for controlling the supply of an actuating substance, a motor for moving the valve means, a control means for the motor, a lever mechanism connected to the control means and having a variable fulcrum and a speed governor driven by the prime mover and connected to the lever mechanism for actuating the control means, means for varying the fulcrum in terms of movement of the motor to cause movement of said motor in a sense opposite to that caused by the speed governor for maintaining the load output of the prime mover substantially constant, said means including another fluid actuated other motor having its piston pivoted to the fulcrum, stops for the piston and a pilot valve for the motor having a valve head with tapered extensions on both sides.

REGINALD G. STANDERWICK.